(12) United States Patent
Jones et al.

(10) Patent No.: US 10,066,691 B2
(45) Date of Patent: Sep. 4, 2018

(54) BRAKE DISC ASSEMBLY

(71) Applicant: THOS. WINNARD & SONS LIMITED, South Yorkshire (GB)

(72) Inventors: Carl Jones, South Yorkshire (GB); Alan Pass, South Yorkshire (GB); Steve Plowright, South Yorkshire (GB)

(73) Assignee: THOS. WINNARD & SONS LIMITED (GB)

( * ) Notice: Subject to any disclaimer, the term of this patent is extended or adjusted under 35 U.S.C. 154(b) by 0 days.

(21) Appl. No.: 15/390,064

(22) Filed: Dec. 23, 2016

(65) Prior Publication Data
US 2018/0180121 A1 Jun. 28, 2018

(51) Int. Cl.
*F16D 65/12* (2006.01)
*F16D 65/02* (2006.01)

(52) U.S. Cl.
CPC .... *F16D 65/123* (2013.01); *F16D 2065/1328* (2013.01); *F16D 2065/1348* (2013.01); *F16D 2065/1384* (2013.01); *F16D 2065/1392* (2013.01)

(58) Field of Classification Search
CPC ............... F16D 65/12; F16D 65/123
USPC .................................................. 188/218 XL
See application file for complete search history.

(56) References Cited

U.S. PATENT DOCUMENTS

| | | | | |
|---|---|---|---|---|
| 6,910,556 B1 * | 6/2005 | Baumgartner | .......... | F16D 65/12 188/18 A |
| 8,061,785 B2 * | 11/2011 | Ilg | ........... | F16D 65/12 188/18 A |
| 2003/0006104 A1 * | 1/2003 | Baumgartner | ........ | F16D 65/123 188/17 |
| 2004/0178031 A1 * | 9/2004 | Gotti | ..................... | F16D 65/123 188/218 XL |
| 2005/0173204 A1 * | 8/2005 | Baumgartner | .......... | F16D 65/12 188/71.1 |
| 2010/0307875 A1 * | 12/2010 | Ilg | ........... | F16D 65/12 188/218 XL |

\* cited by examiner

*Primary Examiner* — Christopher P Schwartz
(74) *Attorney, Agent, or Firm* — Gardner Groff Greenwald & Villanueva, PC

(57) ABSTRACT

There is disclosed a brake disc assembly for attachment to a brake disc hub having a plurality of circumferentially spaced outwardly radially extending hub projections. The brake disc assembly comprises a brake disc having a first side and a second opposing side which is arranged to face the brake disc hub. The brake disc comprises a plurality of circumferentially spaced outwardly extending disc recesses each having first and second recess sidewalls which oppose each other. Each disc recess is provided with first and second intermediate elements which each have a spacer portion adjacent to a respective recess sidewall and a flange portion which is secured to the brake disc. Each disc recess is arranged to receive a corresponding hub projection between the spacer portions of the first and second intermediate elements.

19 Claims, 6 Drawing Sheets

BRAKE DISC ASSEMBLY

TECHNICAL FIELD

The invention relates to a brake disc assembly comprising a brake disc and a plurality of intermediate elements.

BACKGROUND

It is known to provide a brake disc for a vehicle, such as a heavy commercial vehicle, which can be detachably attached to a brake disc hub. In some arrangements the hub is provided with a series of projections which engage with corresponding recesses on the brake disc to facilitate torque transfer. In a previously considered arrangement, after fitting a brake disc to the brake disc hub, spacers are pushed into the gaps between the recesses and projections from a first side of the brake disc which is on the other side to the brake disc hub (i.e. the first side faces away from the brake disc hub). Retaining elements, such as hold-down springs, may then be attached to the brake disc hub from the first side to secure the disc to the hub and so as to hold the spacers in position. Whilst this arrangement may be satisfactory, a relatively large number of components are required for installation which may result in a time-consuming and complicated installation procedure.

It may therefore be desirable to provide an improved brake disc assembly for mounting to a brake disc hub.

SUMMARY

According to an aspect there is provided a brake disc assembly for attachment to a brake disc hub having a plurality of circumferentially spaced outwardly radially extending hub projections, comprising: a brake disc having a first side and a second opposing side which is arranged to face the brake disc hub, the brake disc comprising a plurality of circumferentially spaced outwardly extending disc recesses each having first and second recess sidewalls which oppose each other; wherein each disc recess is provided with first and second intermediate elements secured to the brake disc and which each have a spacer portion adjacent to a respective recess sidewall; and wherein each disc recess is arranged to receive a corresponding hub projection between the spacer portions of the first and second intermediate elements. Each hub projection may have first and second projection sidewalls which oppose each other. With a hub projection within a respective disc recess there may be two pairs of sidewalls formed, each comprising a projection sidewall and an adjacent recess sidewall. A spacer portion may be located between each pair of sidewalls (i.e. located between a disc recess sidewall and a hub projection sidewall). The hub projections and disc recesses may cooperate so as to permit torque transfer. The outer edges of each recess on the second side may be chamfered. The intermediate elements may be shaped to correspond to the chamfered edges.

The first and second intermediate elements may each comprise a flange portion which is secured to the brake disc.

The brake disc may be annular. The disc recesses may be provided on an inner periphery of the brake disc. The hub projections may be provided on an outer periphery of the brake disc hub, The intermediate elements may be fixedly secured to the brake disc. The intermediate elements may be permanently secured or detachably secured to the brake disc.

The flange portion of each intermediate element may be secured to the brake disc with a respective fastener. The flange portion of each intermediate element may comprise an opening through which the fastener, which is secured to the brake disc, passes. The fastener may be a threaded fastener, such as a bolt or a screw. The fastener may be threaded into a threaded hole in the brake disc.

The flange portion of each intermediate element may be located on the second side on the brake disc (i.e. facing the brake disc hub). The flange portion of the first and second intermediate elements may extend in opposite directions away from one another. The first and second intermediate elements may be secured such that they form a mirror image pair. The first and second intermediate elements may be substantially identical. The flange portion of each intermediate element may extend in a direction substantially parallel to a plane within which the brake disc lies. The flange portion of each intermediate element may lie against an outer surface of the brake disc.

The spacer portion of each intermediate element may be axially extending. The first and second sidewalls of the disc recess may be axially extending. The axial length of the spacer portion may be substantially the same as the axial length of the first and second sidewalls. The spacer portion and the flange portion of the intermediate elements may be substantially perpendicular.

The first and second recess sidewalls may each comprise a groove. The intermediate elements may each comprise a lip portion at the opposite end of the spacer portion to the flange portion which is located within a respective groove. The groove may be provided towards the first side of the brake disc.

The intermediate elements may be in the form of bent metal strips.

The disc recesses may be blind recesses having an axial end wall. The axial end wall of the disc recesses may be on the first side of the bake disc. The axial end wall of each disc recess may be provided with a hole which opens into the disc recess and through which a fastener, such as a threaded fastener, can pass and be secured to the hub projection located within the disc recess.

According to another aspect there is provided a brake disc assembly for attachment to a brake disc, comprising: a brake disc comprising: first and second opposing sides; a first friction ring on the first side; a second friction ring on the second side, axially spaced from the first friction surface and arranged to face the brake disc hub; a plurality of circumferentially spaced disc recesses provided on an inner periphery each disc recess having opposing sidewalls; wherein each disc recess is provided with a pair of intermediate elements; each intermediate element comprising: an axially extending spacer portion adjacent to a respective sidewall of the disc recess; and a flange portion substantially perpendicular to the spacer portion and secured to the second side; wherein each disc recess is arranged to receive a corresponding hub projection between the spacer portions of the pair of intermediate elements.

According to another aspect there is provided an assembly comprising: a brake disc hub having a plurality of circumferentially spaced outwardly radially extending hub projections; a brake disc assembly comprising: a brake disc having a first side and a second opposing side and comprising a plurality of circumferentially spaced outwardly extending disc recesses each having first and second recess sidewalls which oppose each other; wherein each disc recess is provided with first and second intermediate elements which are secured to the brake disc and which each have a spacer portion adjacent to a respective recess sidewall; wherein the brake disc assembly is attached to the brake disc hub with the second side of the brake disc facing the hub and with the hub projections located within the respective disc recesses, each hub projection being located between the spacer portions of the first and second intermediate elements.

According to another aspect there is provided a brake disc to which intermediate elements in accordance with any statement herein can be fitted.

According to another aspect there is provided an intermediate element for use with a brake disc assembly in accordance with any statement herein.

These and other aspects, features, and advantages of the invention will be understood with reference to the drawing figures and detailed description herein, and will be realized by means of the various elements and combinations particularly pointed out in the appended claims. It is to be understood that both the foregoing summary and the following brief description of the drawings and detailed description of example embodiments are explanatory of particular example embodiments of the invention and are not restrictive of the invention, as claimed.

DETAILED DESCRIPTION OF EXAMPLE EMBODIMENTS

The present invention may be understood more readily by reference to the following detailed description of example embodiments taken in connection with the accompanying drawing figures, which form a part of this disclosure. It is to be understood that this invention is not limited to the specific devices, methods, conditions, or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Figure 1:
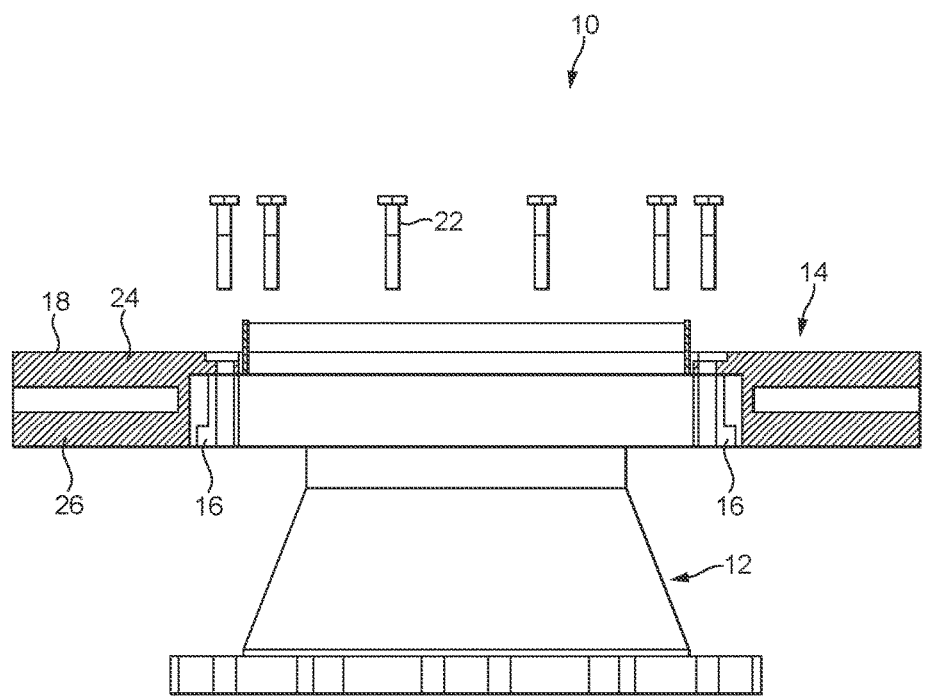
FIG. 1 schematically shows an assembly comprising a brake disc assembly and a brake disc hub.

FIG. 1 shows an assembly 10 comprising a brake disc hub 12 and a brake disc assembly 14. The brake disc hub 12 comprises a plurality of hub projections 16 that are circumferentially distributed around an outer periphery of the hub 12. The hub projections 16 are outwardly radially extending and are evenly spaced. The hub projections 16 are substantially identical to one another and have an L-shaped cross section in a plane which includes the central axis of the hub 12. Each hub projection 16 has a first sidewall and an opposing second sidewall that are axially extending. In this arrangement there are 10 hub projections 16, but it should be appreciated that there may be any suitable number of projections 16. As will be described in detail below, the brake disc assembly 14 comprises a brake disc 18 and a plurality of intermediate elements 20 which are secured to the brake disc 18. The brake disc assembly 14 is secured to the brake disc hub 12 with a plurality of bolts 22 which pass through the brake disc 18 and are threaded into holes provided in the hub projections 16.

Figure 2:
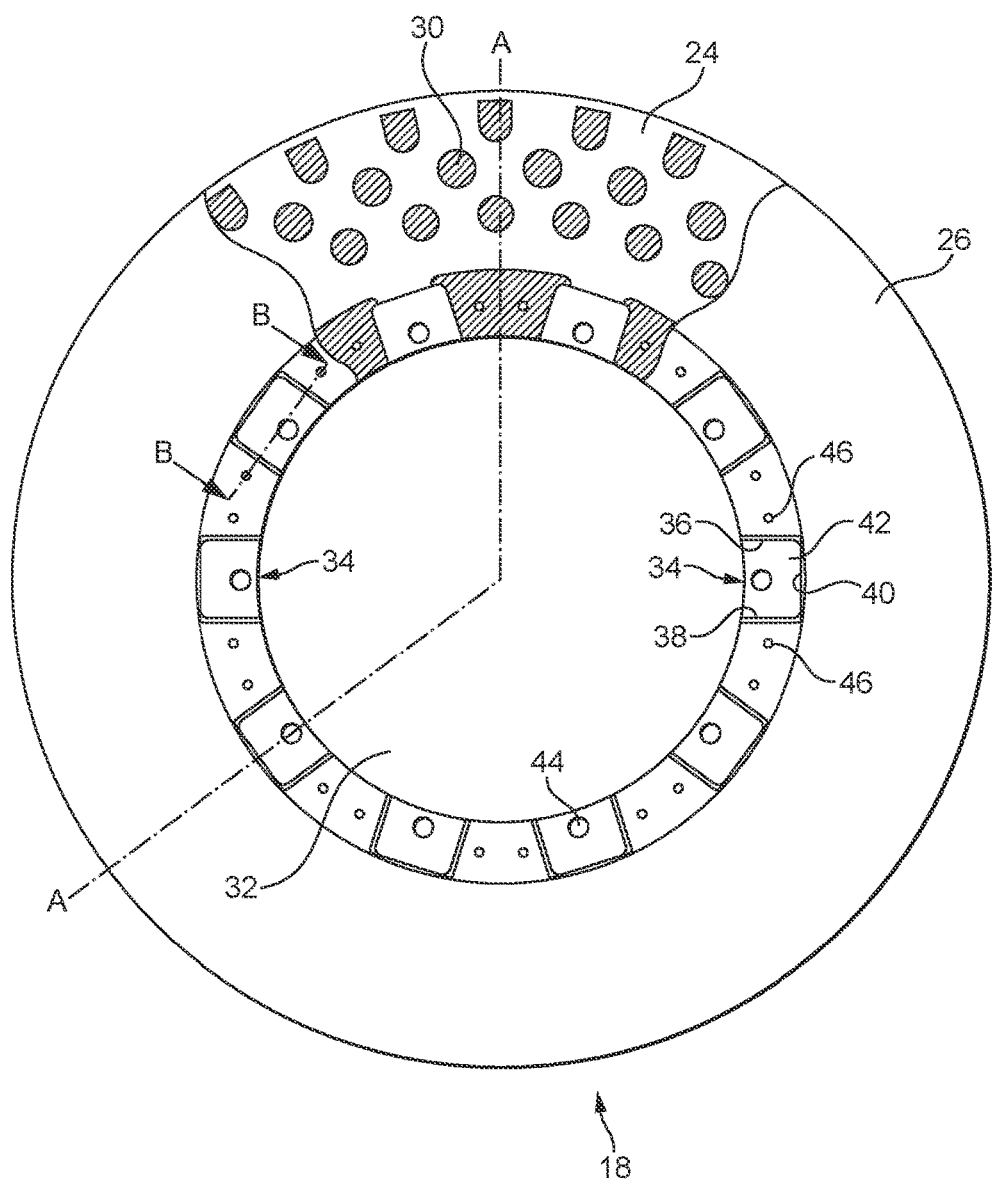
FIG. 2 schematically shows a brake disc from a second side which faces the brake disc hub with a section cut away.
Figure 3:
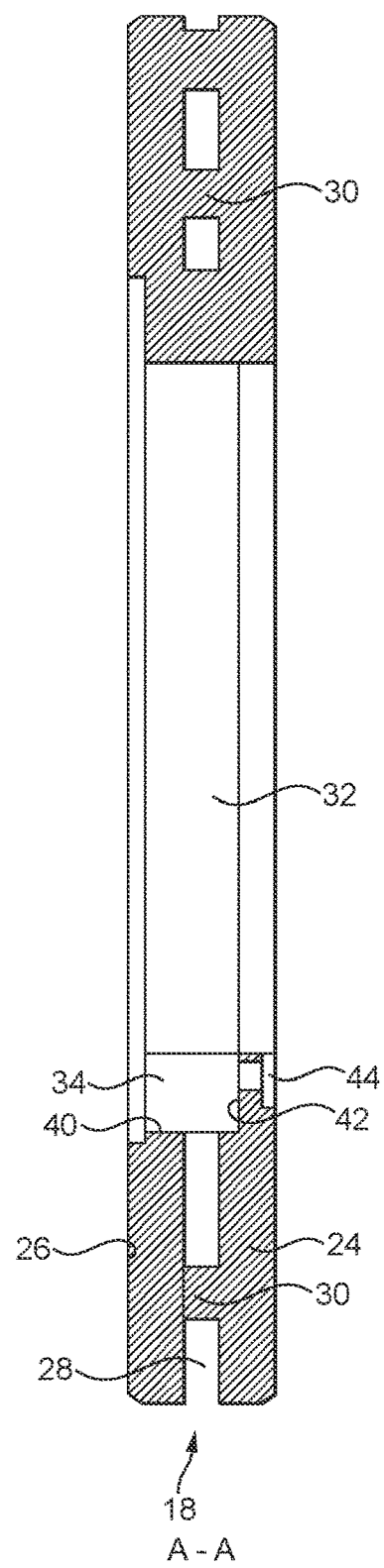
FIG. 3 schematically shows a cross-sectional view of the brake disc of FIG. 2 along the line A-A.
Figure 4:
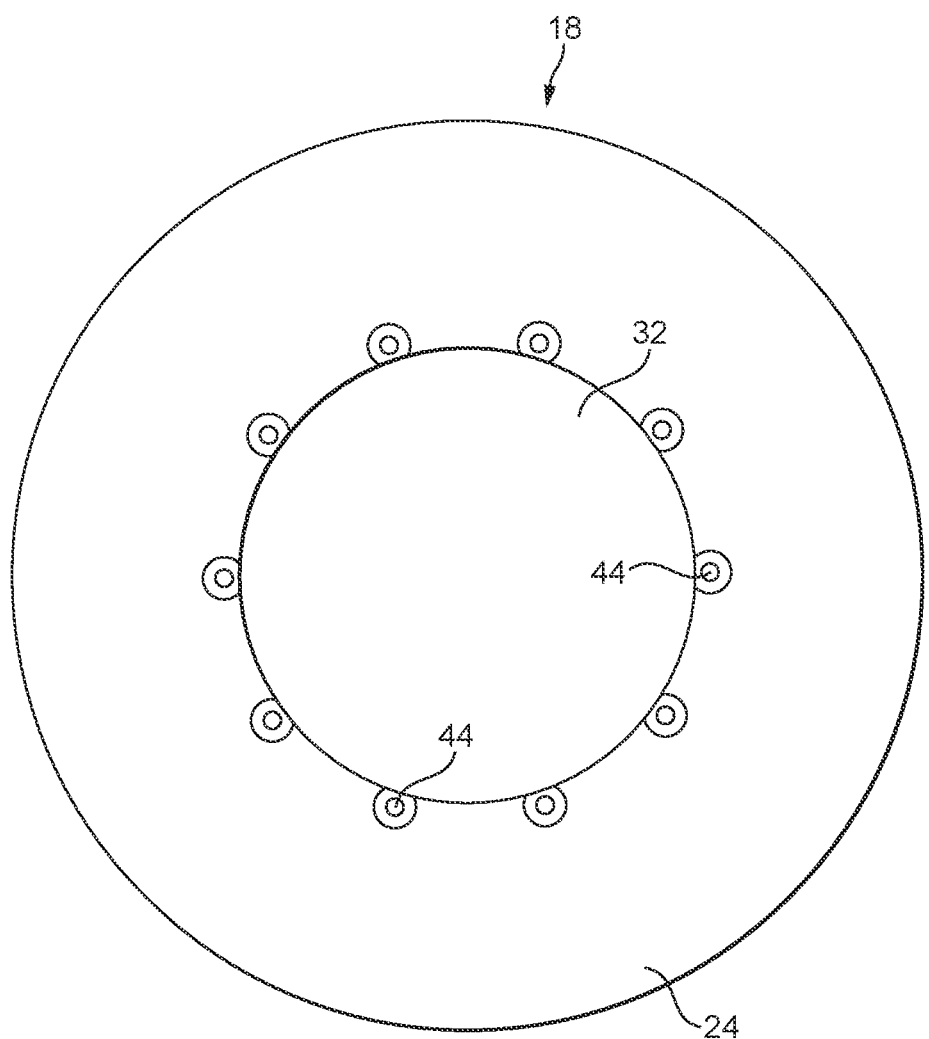
FIG. 4 schematically shows the brake disc of FIG. 2 from a first side which faces away from the brake disc hub.
Figure 5:
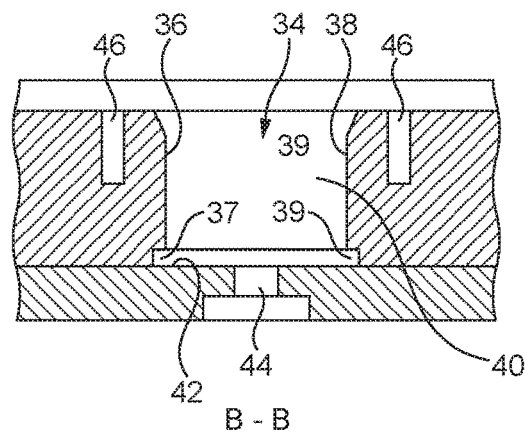
FIG. 5 schematically shows a cross-sectional view of a disc recess along the line B-B in FIG. 2.

Referring to FIGS. 2, 3 and 4, the brake disc 18 is an internally vented disc and comprises a first friction ring 24 on a first side of the disc, and a second friction ring 26 on the second side of the disc. The first and second friction rings 24, 26 are axially spaced apart to define an air channel 28 and are connected together by webs 30. The first side of the brake disc 18 is arranged to face away from the hub 12, whilst the second side of the brake disc 18 is arranged to face towards the hub 12. The brake disc 18 is annular and therefore has a central opening 32. The brake disc 18 comprises a plurality of disc recesses 34 that are distributed around the inner periphery of the disc 18 and which correspond to the hub projections 16. The disc recesses 34 are arranged to receive the hub projections 16. The disc recesses 34 are outwardly radially extending and are evenly spaced. In this arrangement there are 10 substantially identical disc recesses 34. As best shown in FIG. 5, each disc recess 34 is defined by first and second opposing sidewalls 36, 38 that are axially extending, a rear wall 40 that is axially extending, and an axial end wall 42 which lies in a plane perpendicular to the axis of the disc 18. Each recess 34 also comprises first and second grooves 37, 39 that are provided in the respective sidewall 36, 38 at a position adjacent to the end wall 42. The outer edges of the recess 34 may also be chamfered. Each recess 34 is open at the second side of the disc 18 and is closed by the axial end wall 42 at the first side of the disc 18. The recesses 34 may be referred to as blind recesses as they do not pass all the way through the brake disc 18. The axial depth of the recesses 34 are therefore less than the axial thickness of the brake disc 18. The end wall 40 of each recess 34 is provided with a through-hole 44 which is counterbored on the first side and which opens into the recess 34. The holes 44 are provided for the bolts 22 to pass through such that they can be threaded into the holes in the projections 16 so as to axially secure the brake disc 18 to the brake disc hub 12. As shown in FIG. 2, a threaded hole 46 is provided either side of each disc recess on the second side of the brake disc 18. As will be described in detail below, these are provided to allow intermediate elements 20 to be secured within the disc recesses 34.

Figure 6:
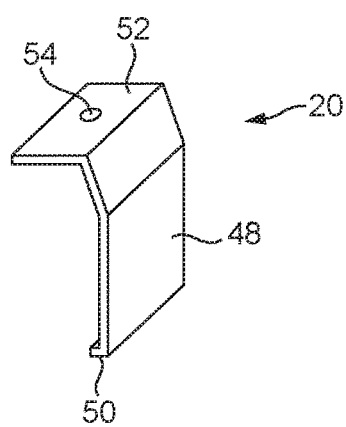
FIG. 6 schematically shows an intermediate element.

Referring to FIG. 6, the intermediate elements 20 are substantially identical and are in the form of bent metal strips. Each intermediate element 20 comprises an axially extending spacer portion 48, a lip portion 50 at a first end of the spacer portion 48, and a flange portion 52 which is at the second opposing end of the spacer portion and which is perpendicular to the spacer portion 48. The spacer portion 48 is slightly bent so as to conform to the chamfered edge of the recesses 34. The flange portion 52 is provided with a through-hole 54 for a threaded fastener. In this arrangement there are two intermediate elements 20 per disc recess 34 and there are therefore 20 intermediate elements 20 in this arrangement.

Figure 8:
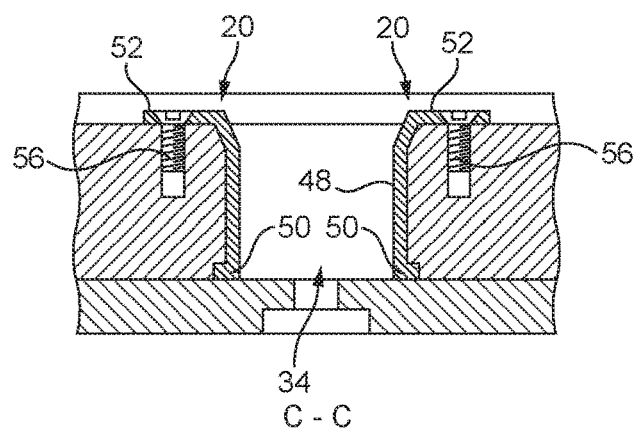
FIG. 8 schematically shows a cross-sectional view of a disc recess with intermediate elements mounted along the line C-C of FIG. 7.
Figure 7:
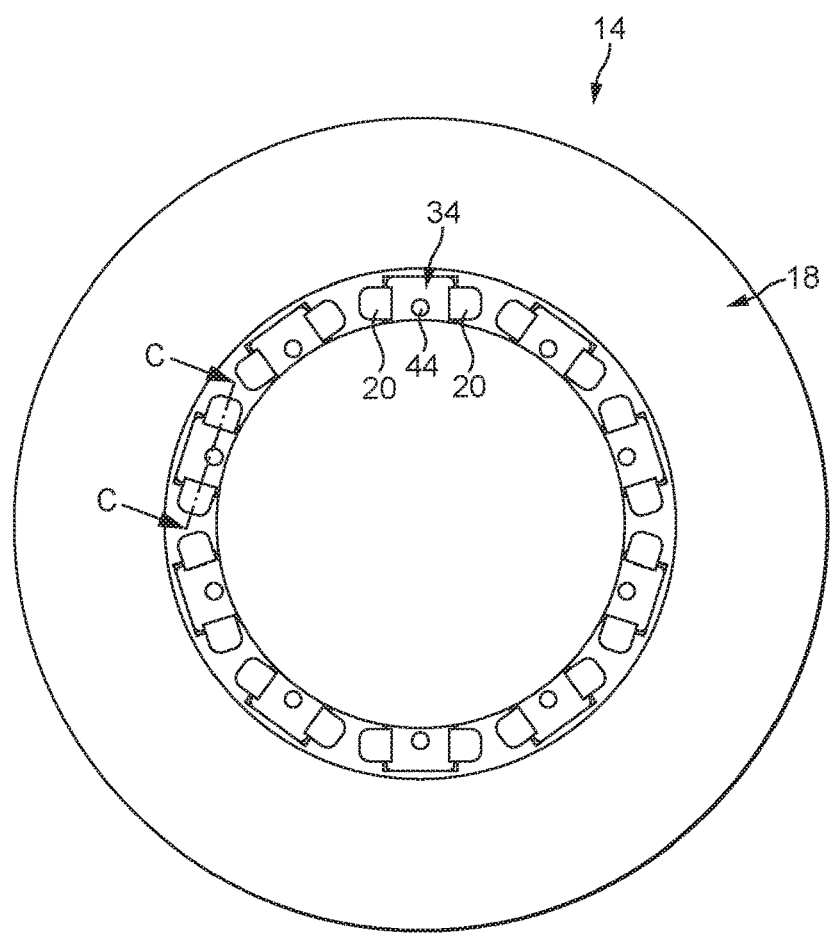
FIG. 7 schematically shows a brake disc assembly comprising a brake disc and a plurality of intermediate elements.

Referring to FIGS. 7 and 8, the intermediate elements 20 are fixedly secured to the brake disc 18 prior to fitting the brake disc assembly 14 to the brake disc hub 12. This means that it is relatively easy to fit the intermediate elements 20. The fitting of the intermediate elements 20 may be done by the manufacturer or in situ. Each disc recess 34 is provided with two intermediate elements 20 which are arranged as a mirror image pair. The intermediate elements 20 are inserted into the recess 34 from the second side of the disc 18. The lip portion 50 is inserted first and is located within the respective groove 37, 37. The lip portion 50 and groove 37, 39 cooperate to correctly locate the intermediate element 20. With the lip portion 50 located within a groove 37, 39, the flange portion 52 is positioned on the second side of the disc 18 and lies flat against a second surface with the holes 46, 54 coaxial with one another. A pair of intermediate elements 20 are located such that the spacer portion 48 of a first intermediate element 20 lies against the first sidewall 36, and such that the spacer portion 48 of a second intermediate element lies against the second sidewall 38. The intermediate elements 20 are secured to the brake disc 18 by using a threaded fastener 56 which passes through the hole 54 in the flange portion 52 and threadedly engages the hole 46 in the brake disc 18. In the installed configuration shown in FIG. 8, the flange portions 52 of a pair of intermediate elements 20 extend away from one another.

Figure 9:
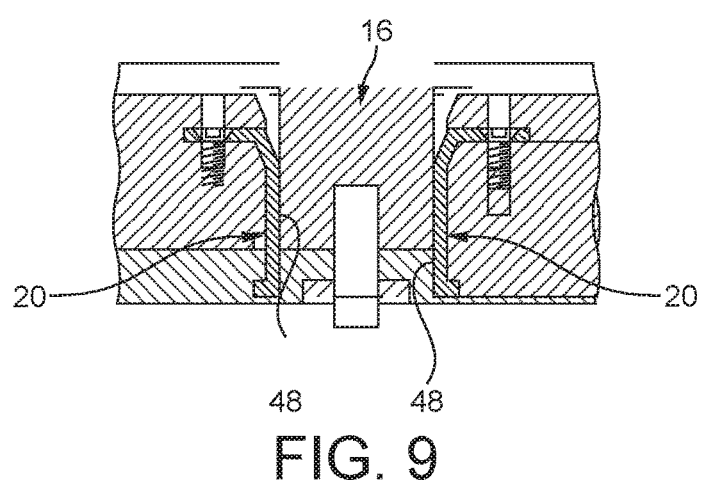
FIG. 9 schematically shows a cross-sectional view of a disc recess and hub projection.

In order to attach the brake disc assembly 14 to the brake disc hub 12, the assembly is oriented such that the second side of the brake disc 18 faces the brake disc hub 12 and is coaxial with the hub 12. The brake disc assembly 14 is then moved towards the hub 12 and is rotated about its axis so that the disc recesses 34 are aligned with the hub projections 16. The brake disc assembly 14 is pushed into position such that the hub projections 16 locate within the disc recesses 34. As shown in FIG. 9, when the hub projections 16 are located within the disc recesses 34, the spacer portion 48 of an intermediate element 20 is between each adjacent pair of sidewalls (i.e. between each adjacent recess sidewall 36, 38 and projection sidewall). In order to axially secure the brake disc assembly 14 to the brake disc hub 12, threaded fasteners 22 are passed through the holes 44 in the brake disc 18 from the first side and are threaded into the holes in the hub projections 16. With the brake disc assembly 14 attached to the hub 12, flange portions 52 are on the hub-side and face the brake disc hub 14. In use, torque is transferred between the brake disc assembly 14 and brake disc hub 12 via the cooperation of the hub projections 16 and the disc recesses 34.

The intermediate elements 20 may ensure a good fit and may accommodate for any manufacturing tolerances. Further, they may prevent direct contact between the hub projections and the disc recesses and may therefore reduce wear.

The intermediate elements 20 may also help to prevent heat transfer from the brake disc 18 to the brake disc hub 14. This may ensure that the disc 18 remains flat and may therefore prolong the life and/or improve performance. If the intermediate elements 20 are pre-fitted to the brake disc 18 then this may reduce the installation time and make the installation easier.

If the edges of the recesses 34 are chamfered then this may aid alignment and installation. The intermediate elements 20 may therefore centralise and pre-load the brake disc into position, allowing it to be mounted with minimal effort. Securing the intermediate elements 20 to the brake disc may ensure that there is no movement of the intermediate elements 20 during distribution or fitting onto the hub 12. The cooperation between the lip portions 50 and the grooves 37, 39 may also help to ensure that the intermediate elements 20 cannot work loose during use.

Although it has been described that the intermediate elements 20 are secured with threaded fasteners such as screws, it should be appreciated that the flange portions 52 could be secured to the disc 18 in other ways. Further, it is not essential that the edges of the recesses 34 are chamfered.

It has been described that each intermediate element 20 has a flange portion secured to the brake disc. However, in other arrangements the intermediate element may be secured to the brake disc in other ways.

While the invention has been described with reference to example embodiments, it will be understood by those skilled in the art that a variety of modifications, additions and deletions are within the scope of the invention, as defined by the following claims.

What is claimed is:

1. A brake disc assembly for attachment to a brake disc hub having a plurality of circumferentially spaced outwardly radially extending hub projections, comprising:
   a brake disc having a first side and a second opposing side which is arranged to face the brake disc hub, the brake disc comprising a plurality of circumferentially spaced outwardly extending disc recesses each having first and second recess sidewalls which oppose each other;
   wherein each disc recess is provided with first and second intermediate elements secured to the brake disc and which each have a spacer portion adjacent to a respective recess sidewall; and
   wherein each disc recess is arranged to receive a corresponding hub projection between the spacer portions of the first and second intermediate elements.

2. A brake disc assembly according to claim 1, wherein the first and second intermediate elements each comprise a flange portion which is secured to the brake disc.

3. A brake disc assembly according to claim 2, wherein the flange portion of each intermediate element is secured to the brake disc with a respective fastener.

4. A brake disc assembly according to claim 3, wherein the flange portion of each intermediate element comprises an opening through which the fastener, which is secured to the brake disc, passes.

5. A brake disc assembly according to claim 4, wherein the fastener is a threaded fastener, and wherein the fastener is threaded into a threaded hole in the brake disc.

6. A brake disc assembly according to claim 2, wherein the flange portion of each intermediate element is located on the second side on the brake disc.

7. A brake disc assembly according to claim 2, wherein the flange portion of the first and second intermediate elements extend in opposite directions away from one another.

8. A brake disc assembly according to claim 2, wherein the flange portion of each intermediate element extends in a direction substantially parallel to a plane within which the brake disc lies.

9. A brake disc assembly according to claim 2, wherein the flange portion of each intermediate element lies against an outer surface of the brake disc.

10. A brake disc assembly according to claim 2, wherein the spacer portion and the flange portion of the intermediate elements are substantially perpendicular.

11. A brake disc assembly according to claim 1, wherein the spacer portion of each intermediate element is axially extending.

12. A brake disc assembly according to claim 1, wherein the intermediate elements are fixedly secured to the brake disc.

13. A brake disc assembly according to claim 1, wherein the first and second recess sidewalls each comprise a groove, and wherein the intermediate elements each comprises a lip portion which is located within a respective groove.

14. A brake disc assembly according to claim 1, wherein the intermediate elements are in the form of bent metal strips.

15. A brake disc assembly according to claim 1, wherein the disc recesses are blind recesses having an axial end wall.

16. A brake disc assembly according to claim 15, wherein the axial end wall of the disc recesses are on the first side of the bake disc.

17. A brake disc assembly according to claim 16, wherein the axial end wall of each disc recess is provided with a hole which opens into the disc recess and through which a fastener can pass and be secured to the hub projection located within the disc recess.

18. A brake disc assembly for attachment to a brake disc, comprising:
   a brake disc comprising:
      first and second opposing sides;
      a first friction ring on the first side;
      a second friction ring on the second side, axially spaced from the first friction surface and arranged to face the brake disc hub;
      a plurality of circumferentially spaced disc recesses provided on an inner periphery each disc recess having opposing sidewalls;
   wherein each disc recess is provided with a pair of intermediate elements;
   each intermediate element comprising:
      an axially extending spacer portion adjacent to a respective sidewall of the disc recess; and
      a flange portion substantially perpendicular to the spacer portion and secured to the second side;
   wherein each disc recess is arranged to receive a corresponding hub projection between the spacer portions of the pair of intermediate elements.

19. An assembly comprising:
   a brake disc hub having a plurality of circumferentially spaced outwardly radially extending hub projections;
   a brake disc assembly comprising:
      a brake disc having a first side and a second opposing side and comprising a plurality of circumferentially spaced outwardly extending disc recesses each having first and second recess sidewalls which oppose each other;
      wherein each disc recess is provided with first and second intermediate elements secured to the brake disc and which each have a spacer portion adjacent to a respective recess sidewall;
   wherein the brake disc assembly is attached to the brake disc hub with the second side of the brake disc facing the hub and with the hub projections located within the respective disc recesses, each hub projection being located between the spacer portions of the first and second intermediate elements.

\* \* \* \* \*